United States Patent
Pankaj et al.

(10) Patent No.: US 11,725,590 B2
(45) Date of Patent: Aug. 15, 2023

(54) TURBOMACHINE AND GEAR ASSEMBLY

(71) Applicant: General Electric Company, Schenectady, NY (US)

(72) Inventors: Peeyush Pankaj, Bangalore (IN); Narayanan Payyoor, Bangalore (IN); Shashank Suresh Puranik, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/463,864

(22) Filed: Sep. 1, 2021

(65) Prior Publication Data

US 2022/0128009 A1   Apr. 28, 2022

(30) Foreign Application Priority Data

Oct. 22, 2020   (IN) .............................. 202011046038

(51) Int. Cl.
*F02C 7/36* (2006.01)
*F02K 3/06* (2006.01)

(52) U.S. Cl.
CPC ................. *F02C 7/36* (2013.01); *F02K 3/06* (2013.01); *F05D 2220/323* (2013.01); *F05D 2220/36* (2013.01); *F05D 2260/40311* (2013.01)

(58) Field of Classification Search
CPC ...... F02C 7/36; F02C 7/06; F02K 3/06; F05D 2220/36; F05D 2220/323; F05D 2240/54; F04D 2260/40311; F04D 2260/98; F16H 1/46; F16H 2057/085; F01D 1/24
See application file for complete search history.

(56) References Cited

U.S. PATENT DOCUMENTS

| | | | |
|---|---|---|---|
| 2,472,878 A * | 6/1949 | Baumann | F01D 5/03 60/39.183 |
| 5,010,729 A * | 4/1991 | Adamson | F02C 3/067 416/129 |
| 5,137,425 A | 8/1992 | Rohra et al. | |
| 7,451,592 B2 | 11/2008 | Taylor et al. | |
| 8,015,798 B2 * | 9/2011 | Norris | F02C 3/067 60/268 |
| 8,191,352 B2 | 6/2012 | Schilling | |
| 8,814,505 B2 | 8/2014 | Bellis | |

(Continued)

*Primary Examiner* — Woody A Lee, Jr.
*Assistant Examiner* — Joshua R Beebe
(74) *Attorney, Agent, or Firm* — Dority & Manning, P.A.

(57) ABSTRACT

A turbomachine engine and gear assembly is provided. The engine includes a first power input component rotatable along a first direction relative to the engine centerline axis, a second power input component rotatable along a second direction relative to the engine centerline axis, a power output component rotatable relative to the engine centerline axis, a static component fixed relative to a circumferential direction relative to a gear assembly centerline axis, and a gear assembly. The gear assembly includes a first rotatable gear operably coupled to the first power input component at a first interface. The first rotatable gear is operably coupled to the static component at a static component interface. The static component interface is configured to react against the first rotatable gear to rotate the first rotatable gear relative to the gear assembly centerline axis. The power output component is operably coupled to the first rotatable gear.

20 Claims, 8 Drawing Sheets

(56) References Cited

U.S. PATENT DOCUMENTS

| | | | |
|---|---|---|---|
| 9,017,028 B2 * | 4/2015 | Fabre | F01D 1/26 |
| | | | 416/129 |
| 9,022,725 B2 | 5/2015 | Merry et al. | |
| 9,039,567 B2 | 5/2015 | Fabre | |
| 9,145,847 B2 | 9/2015 | Gallet et al. | |
| 9,581,025 B2 | 2/2017 | Eames | |
| 9,611,788 B2 * | 4/2017 | Sidelkovskiy | F02C 3/107 |
| 10,180,178 B2 | 1/2019 | Boiger et al. | |
| 10,227,928 B2 * | 3/2019 | Kuhne | F02C 3/107 |
| 10,663,036 B2 * | 5/2020 | Stuart | H02K 7/083 |
| 10,801,442 B2 * | 10/2020 | Clements | F02C 3/067 |
| 11,015,533 B2 * | 5/2021 | Sheridan | F16H 1/28 |
| 11,118,506 B2 * | 9/2021 | Mondal | F02C 3/067 |
| 11,118,535 B2 * | 9/2021 | van der Merwe | F02K 3/06 |
| 2012/0023898 A1 * | 2/2012 | Mackie | F01D 1/26 |
| | | | 60/39.162 |
| 2016/0185460 A1 * | 6/2016 | Cedoz | B64D 35/06 |
| | | | 416/128 |
| 2018/0223732 A1 | 8/2018 | Clements et al. | |
| 2018/0281979 A1 | 10/2018 | Reigner et al. | |
| 2019/0085720 A1 * | 3/2019 | Pankaj | F02C 7/36 |

* cited by examiner

TURBOMACHINE AND GEAR ASSEMBLY

PRIORITY INFORMATION

The present application claims priority to Indian Patent Application Number 202011046038 filed on Oct. 22, 2020.

FIELD

The present subject matter relates generally turbomachines including gear assemblies. The present subject matter relates particularly to gear assembly arrangements and gear assembly arrangements particular to certain turbomachine configurations.

BACKGROUND

A turbofan engine operates on the principle that a central gas turbine core drives a bypass fan, the bypass fan being located at a radial location between a nacelle of the engine and the engine core. With such a configuration, the engine is generally limited in a permissible size of the bypass fan, as increasing a size of the fan correspondingly increases a size and weight of the nacelle.

An open rotor engine, by contrast, operates on the principle of having the bypass fan located outside of the engine nacelle. This permits the use of larger rotor blades able to act upon a larger volume of air than for a traditional turbofan engine, potentially improving propulsive efficiency over conventional turbofan engine designs.

Turbomachines such as open rotor engines may require large gear ratios between the low speed spool and the fan rotor to permit the larger rotor blades to act upon a larger volume of air and/or to do so at certain desired operating speeds of the engine or aircraft. One challenge is that known gear assemblies may provide inadequate gear ratios for desired open rotor engine operation. For example, known gear assemblies may inadequately reduce the output rotational speed relative to the turbines, such that the fan rotor operates too fast and inefficient and/or the turbine operates too slow and inefficient. Another challenge is that known gear assemblies that may be scaled to provide adequate gear ratios may be too large for a desired length and/or diameter of the engine. Yet another challenge is that known gear assemblies may be inadequate for receiving multiple input shafts and/or counter-rotating input shafts. Therefore, inter-digitated compressor and/or turbine structures may be incompatible with certain known gear assemblies.

As such, there is a need for gear assemblies that may receive multiple input shafts, counter-rotating input shafts, and/or provide for multiple output shafts that provide desired gear ratios, and/or arrange within desired diametrical or length constraints, as may be suitable for turbomachines generally, or open rotor engines particularly.

BRIEF DESCRIPTION

Aspects and advantages of the invention will be set forth in part in the following description, or may be obvious from the description, or may be learned through practice of the invention.

An aspect of the present disclosure is directed to a turbomachine engine and gear assembly. An engine centerline axis is defined through the engine. The engine includes a first power input component rotatable along a first direction relative to the engine centerline axis, a second power input component rotatable along a second direction relative to the engine centerline axis, a power output component rotatable relative to the engine centerline axis, a static component fixed relative to a circumferential direction relative to a gear assembly centerline axis, and a gear assembly. The gear assembly includes a first rotatable gear operably coupled to the first power input component at a first interface. The first rotatable gear is operably coupled to the static component at a static component interface. The static component interface is configured to react against the first rotatable gear to rotate the first rotatable gear relative to the gear assembly centerline axis. The power output component is operably coupled to the first rotatable gear. The first power input component and the second power input component are together configured to transmit through a second interface at the first power input component to the power output component. The first interface and the second interface are separated along an axial direction relative to the gear assembly centerline axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine or gear assembly described herein below may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of gears, housings, conduits, heat exchangers, or other gear assembly components having unique features, configurations, thicknesses, materials, densities, fluid passageways, headers, and mounting structures that may not have been possible or practical using prior manufacturing methods. Some of these features are described herein.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

Figure 1:
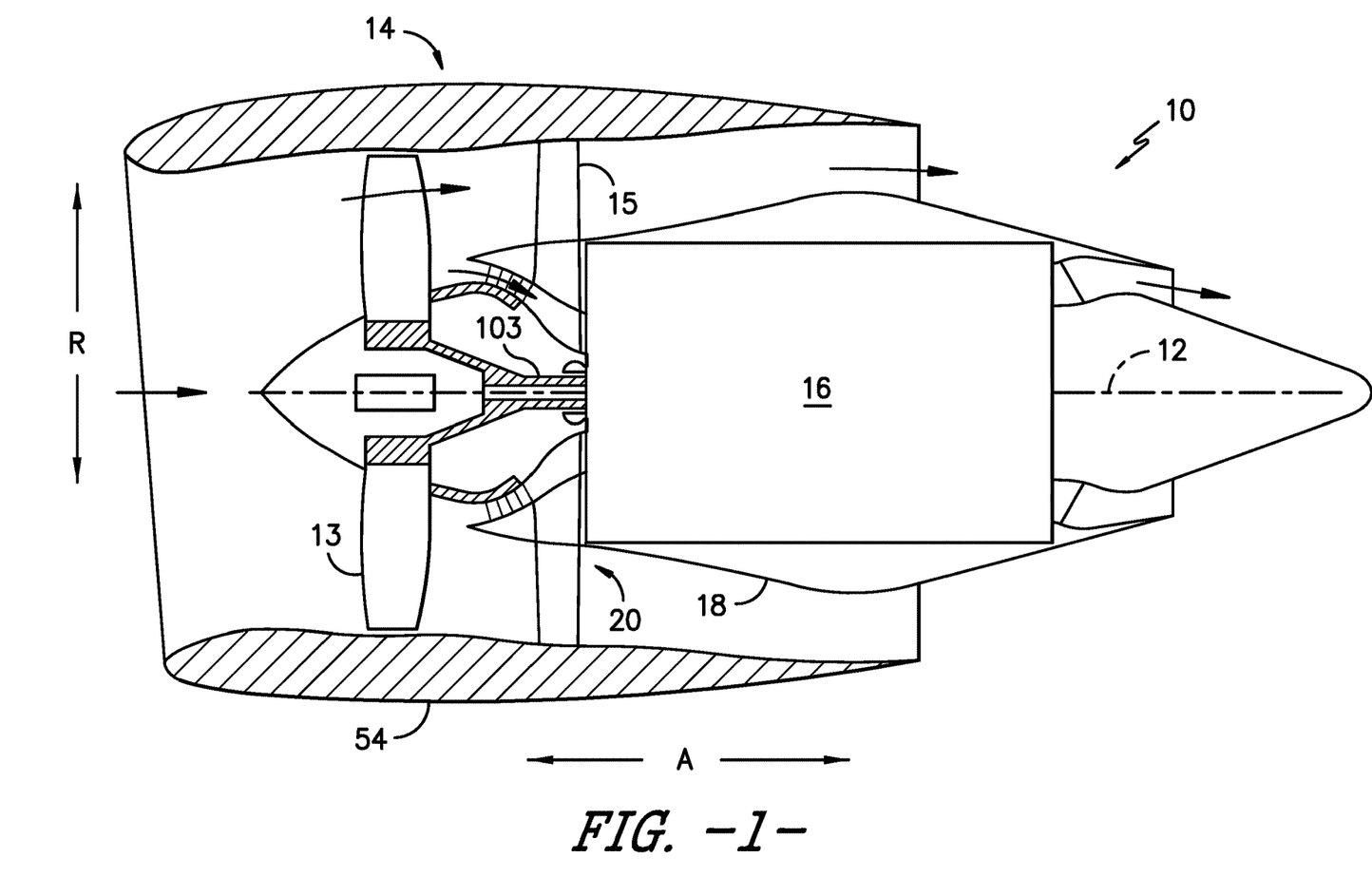
FIG. 1 is a schematic cross-sectional view of an exemplary embodiment of a turbomachine including a core engine with a gear assembly according to an aspect of the present disclosure.
Figure 2:
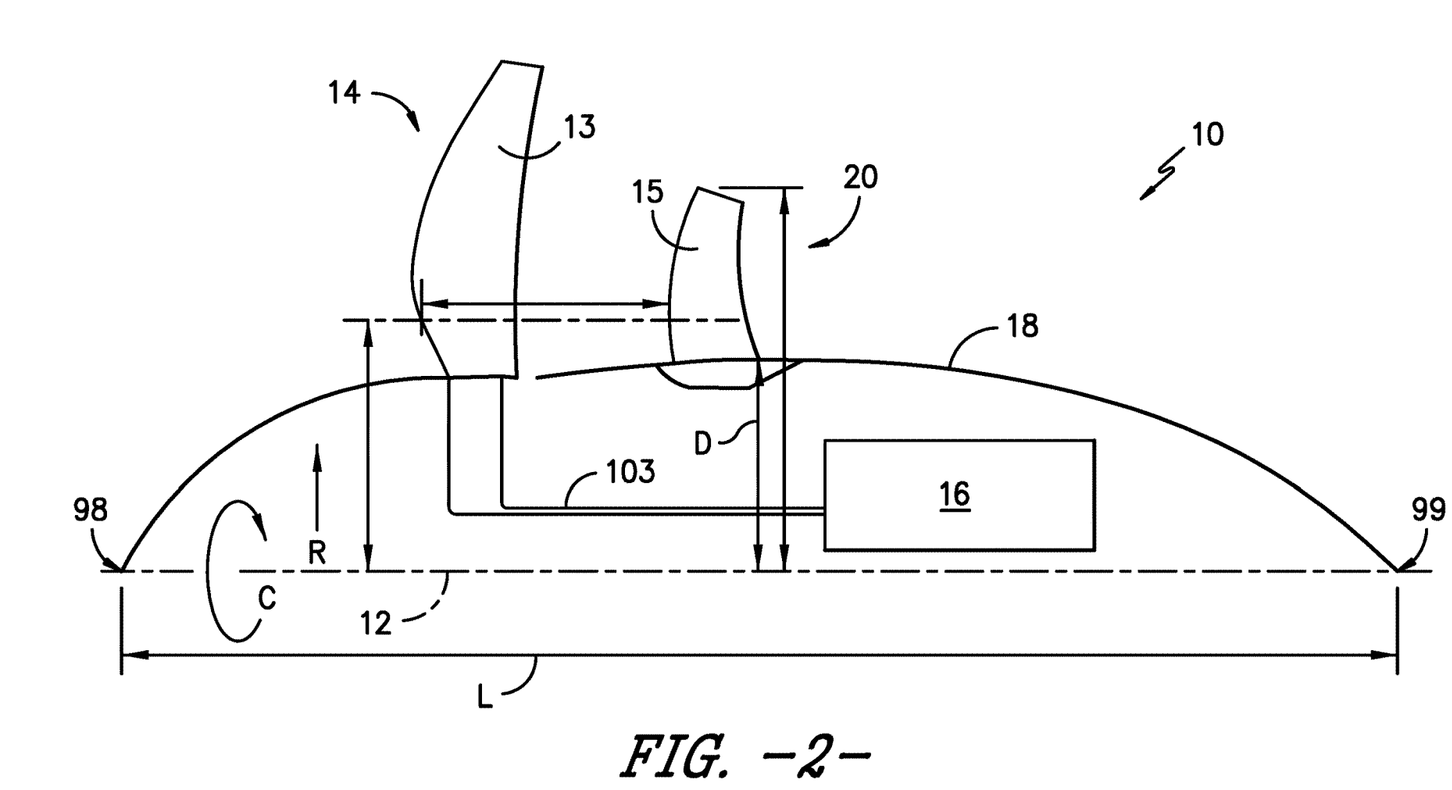
FIG. 2 is a cutaway side view of an exemplary embodiment of a turbomachine engine including a core engine with a gear assembly according to an aspect of the present disclosure.

Referring now to the drawings, FIGS. 1-2 are exemplary embodiments of an engine 10 including a gear assembly according to aspects of the present disclosure. The engine 10 includes a fan assembly 14 driven by a core engine 16. In various embodiments, the core engine 16 is generally a Brayton cycle system configured to drive the fan assembly 14. The core engine 16 is shrouded, at least in part, by an outer casing 18. The fan assembly 14 includes a plurality of fan blades 13. A vane assembly 20 is extended from the outer casing 18. The vane assembly 20 including a plurality of vanes 15 is positioned in operable arrangement with the fan blades 13. The vane assembly 20 may provide thrust, control thrust vector, abate or re-direct undesired acoustic noise, or otherwise desirably alter a flow of air relative to the fan blades 13.

In certain embodiments, such as depicted in FIGS. 1-2, the vane assembly 20 is positioned downstream or aft of the fan assembly 14. However, it should be appreciated that in some embodiments, the vane assembly 20 may be positioned upstream or forward of the fan assembly 14. In still various embodiments, the engine 10 may include a first vane assembly positioned forward of the fan assembly 14 and a second vane assembly positioned aft of the fan assembly 14. The fan assembly 14 may be configured to desirably adjust pitch at one or more fan blades 13, such as to control thrust vector, abate or re-direct noise, or alter thrust output. The vane assembly 20 may be configured to desirably adjust pitch at one or more vanes 15, such as to control thrust vector, abate or re-direct noise, or alter thrust output. Pitch control mechanisms at one or both of the fan assembly 14 or the vane assembly 20 may co-operate to produce one or more desired effects described above.

In various embodiments, such as depicted in FIG. 1, the engine 10 is a turbofan gas turbine engine including a nacelle or fan casing 54 shrouding the fan assembly 14. In other embodiments, such as depicted in FIG. 2, the engine 10 is an unducted thrust producing system, such that the plurality of fan blades 13 is unshrouded by a nacelle or fan casing. As such, in various embodiments, the engine 10 may be configured as an unshrouded turbofan engine, an open rotor engine, or a prop fan engine. In particular embodiments, the engine 10 is a single unducted rotor engine including a single row of fan blades 13. The engine 10 may include the fan assembly 14 having large-diameter fan blades 13, such as may be suitable for high bypass ratios, high cruise speeds, high cruise altitude, and/or relatively low rotational speeds. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degree Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

The core engine 16 is generally encased in outer casing 18 defining a maximum diameter. In certain embodiments, the engine 10 includes a length from a longitudinally forward end 98 to a longitudinally aft end 99. In various embodiments, the engine 10 defines a ratio of length (L) to maximum diameter ($D_{max}$) that provides for reduced installed drag. In one embodiment, $L/D_{max}$ is at least 2. In another embodiment, $L/D_{max}$ is at least 2.5. In various embodiments, it should be appreciated that the $L/D_{max}$ is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the $L/D_{max}$, the fan assembly 14, and/or the vane assembly 20 separately or together configure, at least in part, the engine 10 to operate at a maximum cruise altitude operating speed between approximately Mach 0.55 and approximately Mach 0.85.

Figure 3:
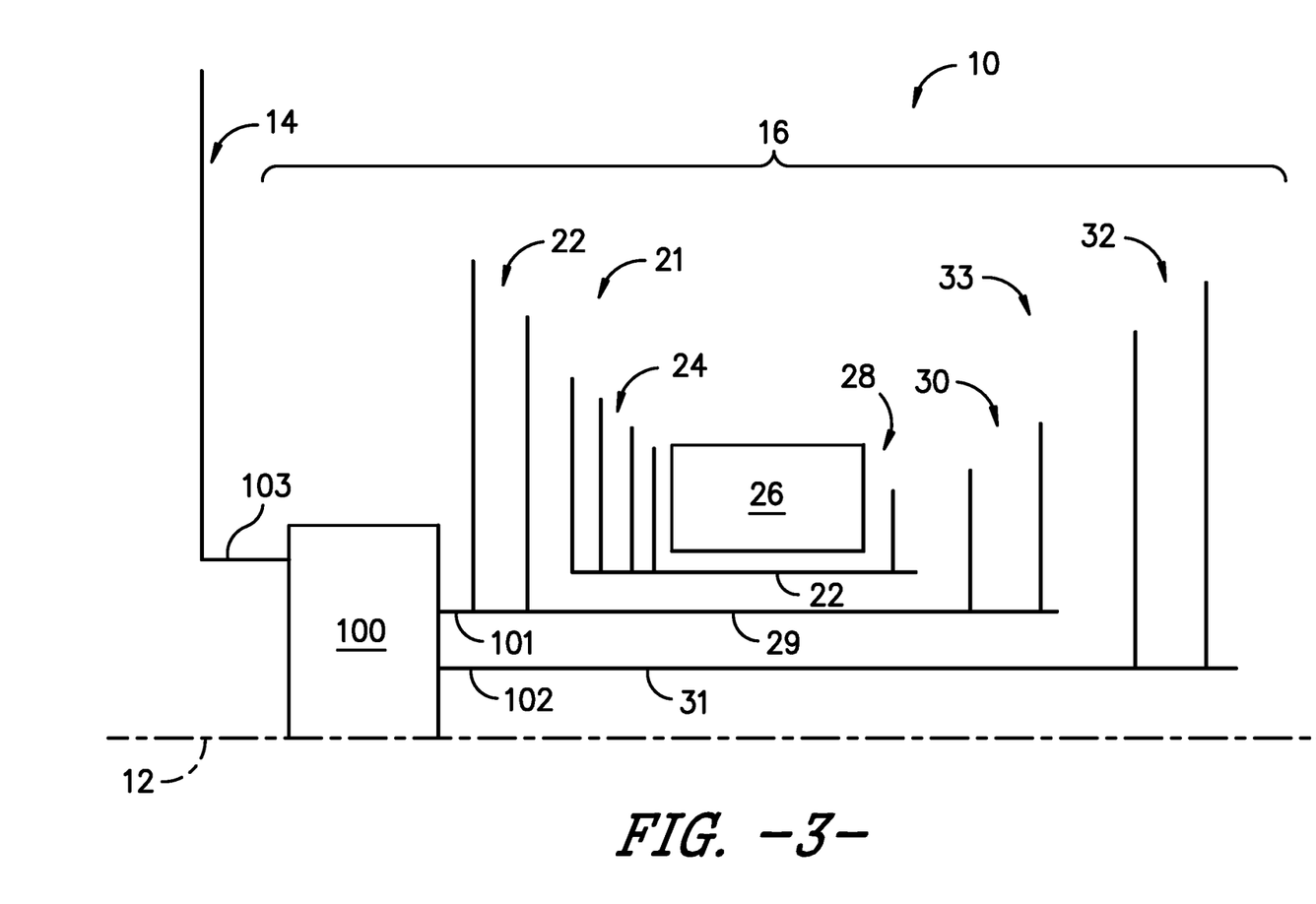
FIG. 3 is an exemplary schematic embodiment of the engine of FIGS. 1-2 according to an aspect of the present disclosure.
Figure 4:
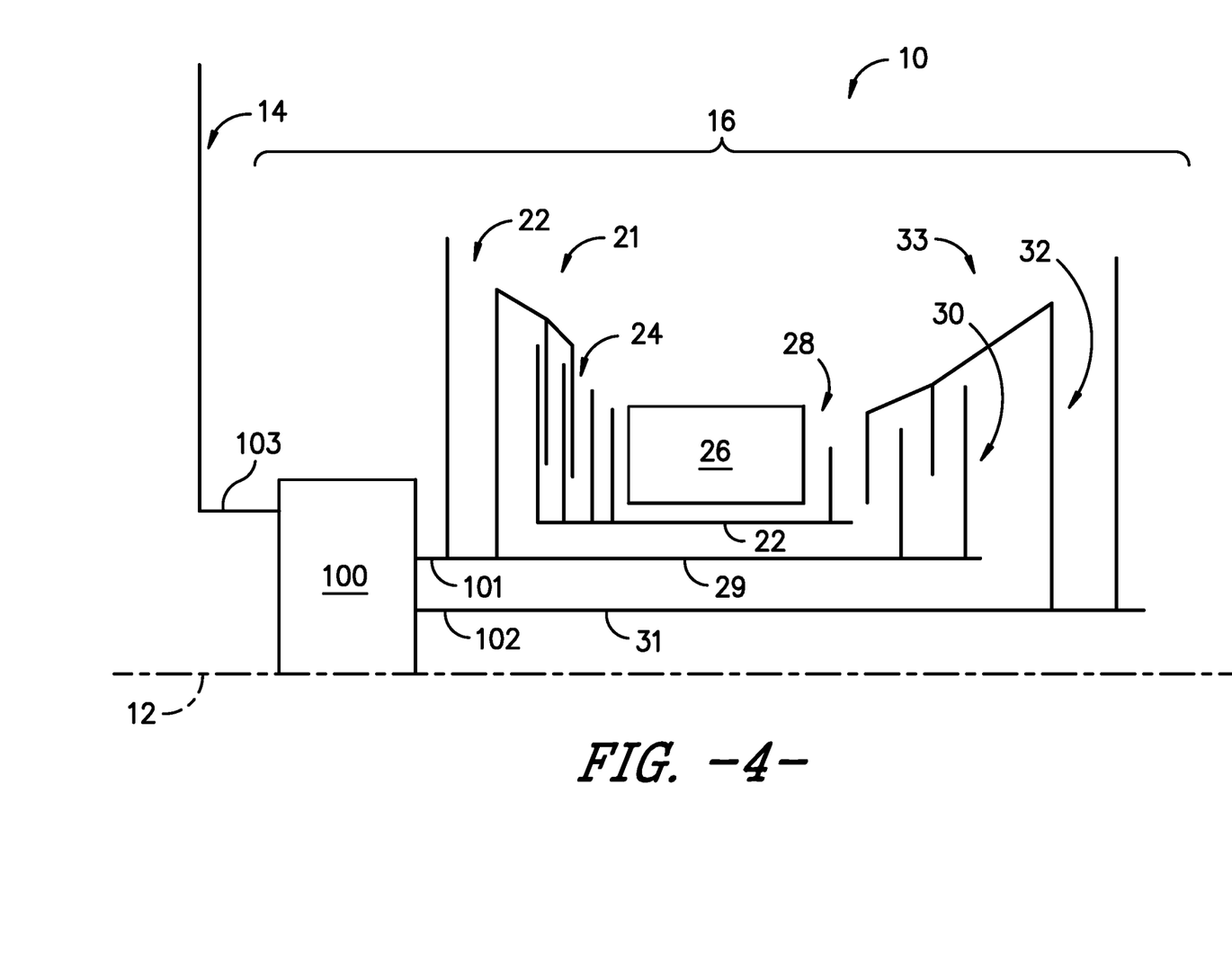
FIG. 4 is an exemplary schematic embodiment of the engine of FIGS. 1-2 according to an aspect of the present disclosure.
Figure 5:
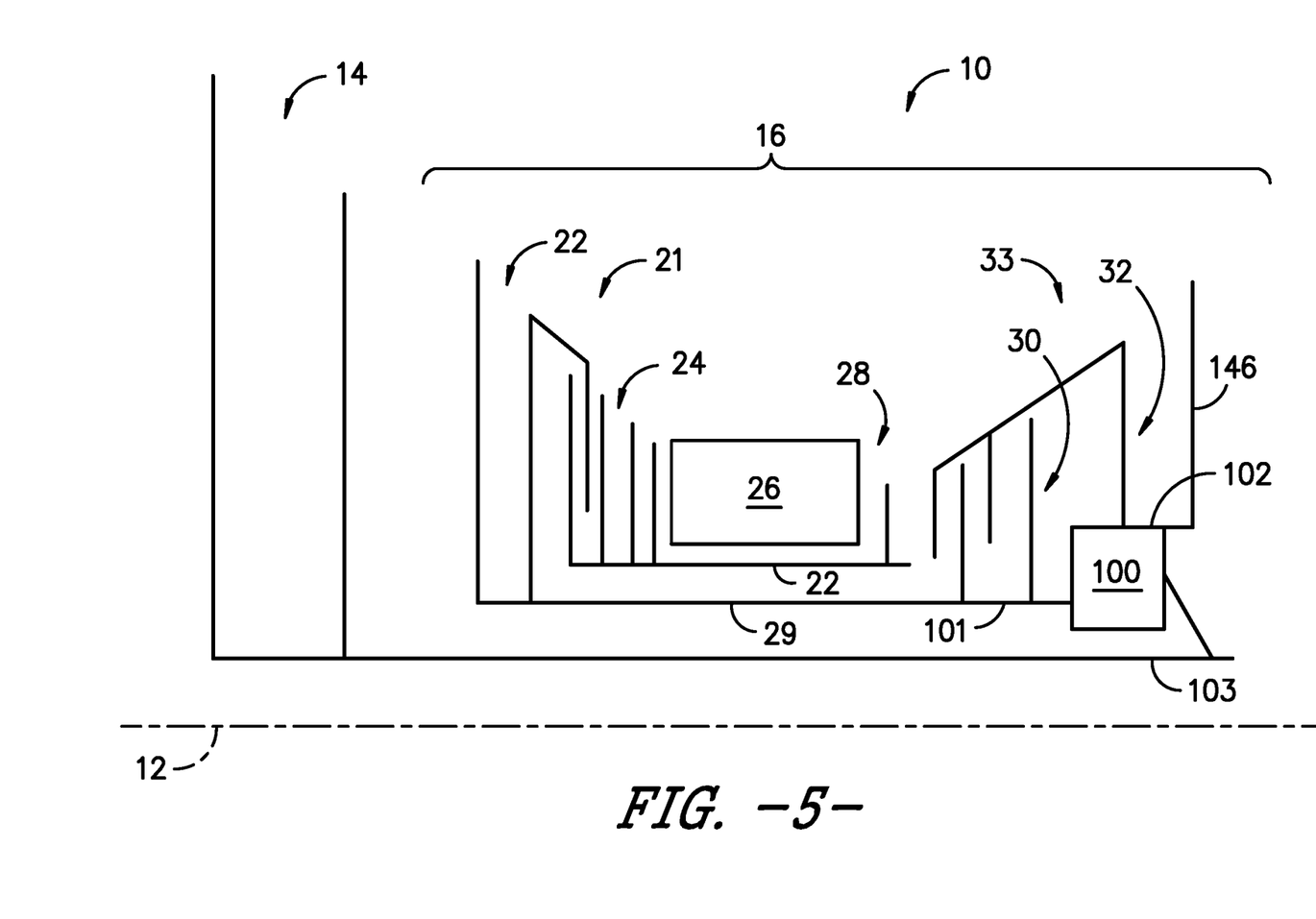
FIG. 5 is an exemplary schematic embodiment of the engine of FIGS. 1-2 according to an aspect the present disclosure.

Referring now to FIGS. 3-5, exemplary embodiments of the core engine 16 are provided. The core engine 16 includes a compressor section 21, a heat addition system 26, and an expansion section 33 together in serial flow arrangement. The core engine 16 is extended circumferentially relative to an engine centerline axis 12. The core engine 16 includes a high-speed spool that includes a high-speed compressor 24 and a high-speed turbine 28 operably rotatably coupled together by a high-speed shaft 22. The heat addition system 26 is positioned between the high-speed compressor 24 and the high-speed turbine 28. Various embodiments of the heat addition system 26 include a combustion section. The combustion section may be configured as a deflagrative combustion section, a rotating detonation combustion section, a pulse detonation combustion section, or other appropriate heat addition system. The heat addition system 26 may be configured as one or more of a rich-burn system or a lean-burn system, or combinations thereof. In still various embodiments, the heat addition system 26 includes an annular combustor, a can combustor, a cannular combustor, a trapped vortex combustor (TVC), or other appropriate combustion system, or combinations thereof.

Referring still to FIGS. 3-5, the core engine 16 includes a booster or low-speed compressor 22 positioned in flow relationship with the high-speed compressor 24. The low-speed compressor 22 is rotatably coupled with a first turbine 30 via a first shaft 29. Various embodiments of the expansion section 33 further include a second turbine 32 rotatably coupled to a second shaft 31. The first turbine 30 and the second turbine 32 are each operably connected to a gear assembly 100 to provide power to the fan assembly 14, such as described further herein.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine. Alternatively, unless otherwise specified, the aforementioned terms may be understood in their superlative degree. For example, a "low turbine" or "low speed turbine" may refer to the lowest maximum rotational speed turbine within a turbine section, a "low compressor" or "low speed compressor" may refer to the lowest maximum rotational speed turbine within a compressor section, a "high turbine" or "high speed turbine" may refer to the highest maximum rotational speed turbine within the turbine section, and a "high compressor" or "high speed compressor" may refer to the highest maximum rotational speed compressor within the compressor section. Similarly, the low speed spool refers to a lower maximum rotational speed than the high speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

In certain embodiments, such as depicted in FIGS. 3-6, the core engine 16 includes one or more interdigitated structures at the compressor section 21 and/or the expansion section 33. In one embodiment, the expansion section 33 includes the second turbine 32 interdigitated with the first turbine 30, such as via a rotating outer shroud, drum, casing, or rotor. Although not depicted, it should be appreciated that embodiments of the expansion section 33 may include the first and/or second turbine 30, 32 interdigitated with one or more stages of the high-speed turbine 28. In another embodiment, the compressor section 21 includes the low-speed compressor 22 interdigitated with the high-speed compressor 24. For instance, the higher speed compressor, such as the high-speed compressor 24, may be a first compressor interdigitated with the lower speed compressor, such as the low-speed compressor 22.

Referring now to FIG. 2 and FIGS. 3-5, the core engine 16 includes the gear assembly 100 (FIGS. 3-5) configured to transfer power from the expansion section 33 and reduce an output rotational speed at the fan assembly 14 relative to one or both turbines 30, 32 (FIGS. 3-5). Embodiments of the gear assembly 100 depicted and described in regard to FIGS. 6-8 may allow for gear ratios suitable for large-diameter unducted fans and relatively small-diameter and/or relatively high-speed turbines, such as turbines 30, 32 (FIGS. 3-5). Additionally, embodiments of the gear assembly 100 provided herein may be suitable within the radial or diametrical constraints of the core engine 16 within the outer casing 18.

Figure 6:
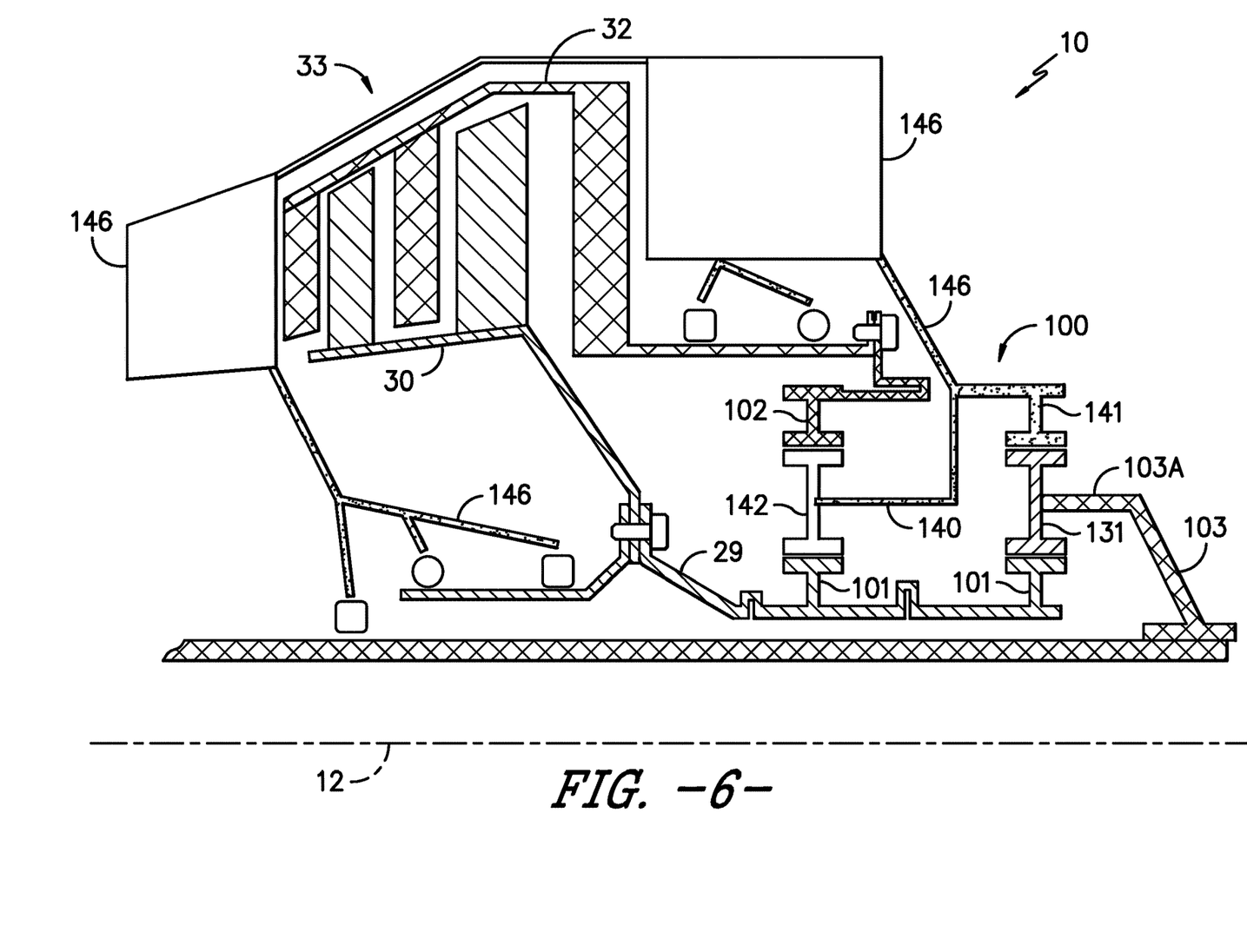
FIG. 6 is an exemplary schematic embodiment of a turbine section of the core engine of FIG. 5 including a gear assembly according to aspects of the present disclosure.
Figure 7:
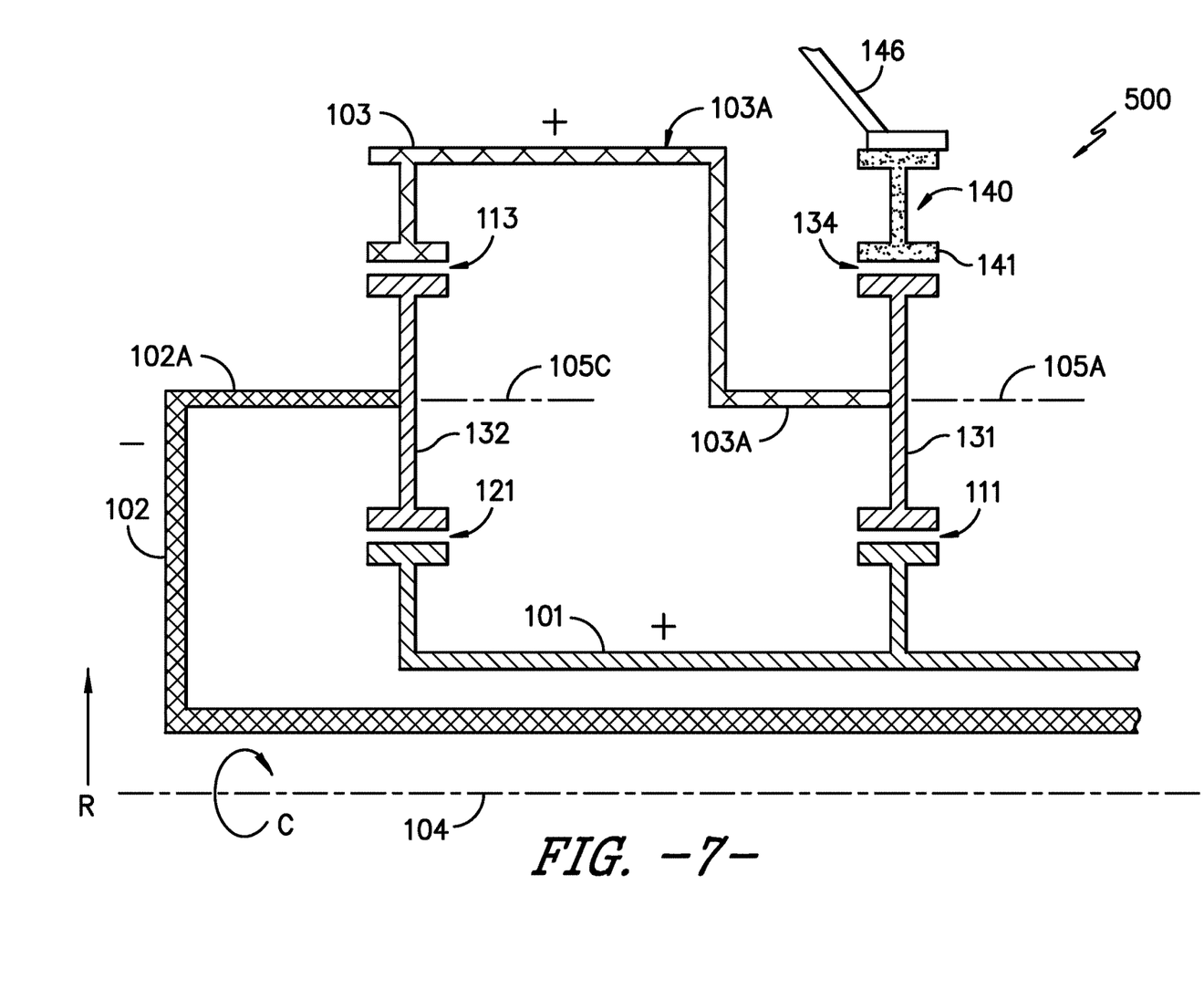
FIG. 7 is a schematic layout of an exemplary gear assembly of the core engine of FIGS. 3-4 according to an aspect of the present disclosure.
Figure 8:
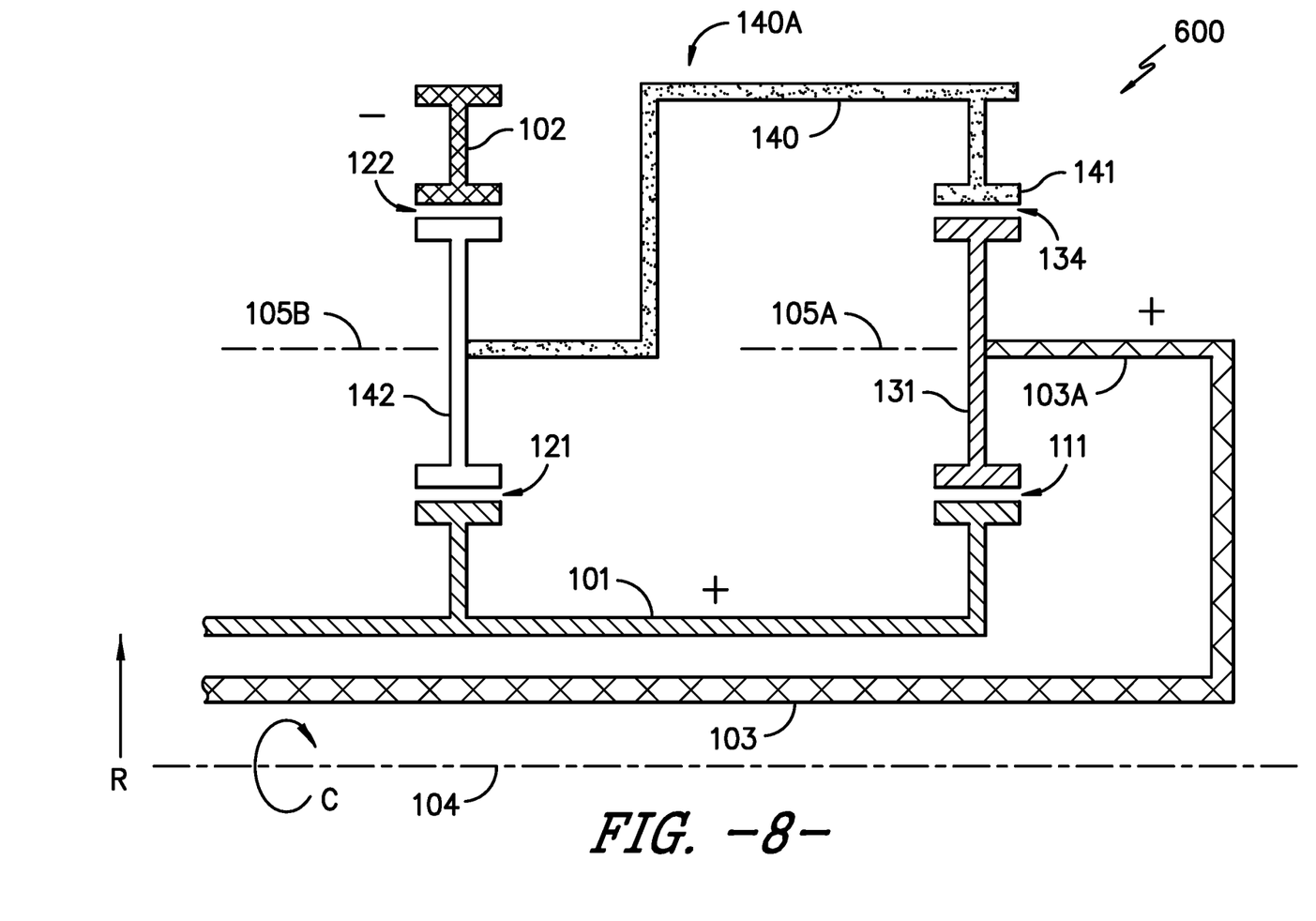
FIG. 8 is a schematic layout of an exemplary gear assembly of FIG. 6 according to an aspect of the present disclosure.

Embodiments of the gear assembly 100 depicted and described in regard to FIGS. 6-8 may provide for gear ratios and arrangements that fit within the $L/D_{max}$ constraints of the engine 10. In certain embodiments, the gear assembly 100 depicted and described in regard to FIGS. 7-8 allow for gear ratios and arrangements providing for rotational speed of the fan assembly 14 corresponding to one or more ranges of cruise altitude and/or cruise speed provided above. Various embodiments of the gear assembly 100 provided herein may allow for gear ratios of up to 14:1. Still various embodiments of the gear assembly 100 provided herein may allow for gear ratios of at least 4:1. Still yet various embodiments of the gear assembly 100 provided herein allow for gear ratios between 4:1 to 12:1 for a two-stage epicyclic gear assembly or compound gear assembly. It should be appreciated that embodiments of the gear assembly 100 provided herein may allow for large gear ratios such as provided herein between the expansion section 33 and the fan assembly 14, or particularly between a first turbine 30 (FIGS. 3-5) and the fan assembly 14 and/or between a second turbine 32 (FIGS. 3-5) and the fan assembly 14, and within constraints such as, but not limited to, length (L) of the engine 10, maximum diameter ($D_{max}$) of the engine 10, cruise altitude of up to 65,000 ft, and/or operating cruise speed of up to Mach 0.85, or combinations thereof.

Although depicted as a turbofan engine and an un-shrouded or open rotor engine, it should be appreciated that aspects of the disclosure provided herein may be applied to shrouded or ducted engines, partially ducted engines, aft-fan engines, or other turbomachine configurations, including those for marine, industrial, or aero-propulsion systems. Certain aspects of the disclosure may be applicable to turbofan, turboprop, or turboshaft engines, such as turbofan, turboprop, or turboshaft engines with reduction gear assemblies. However, it should be appreciated that certain aspects of the disclosure may address issues that may be particular to un-shrouded or open rotor engines. Aspects of the disclosure may provide gear assemblies allowing for particular gear ratios, fan diameter, fan speed, length (L) of the engine 10, maximum diameter ($D_{max}$) of the engine 10, $L/D_{max}$ of the engine 10, desired cruise altitude, and/or desired operating cruise speed, or combinations thereof.

Referring to FIGS. 6-8, schematic embodiments of a gear assembly 100, 500, 600 operably connected to a first power input component 101 and a second power input component 102 are provided. Embodiments of the gear assembly 100 receive power or torque from the first power input component 101 and the second power input component 102. In one embodiment, the first power input component 101 is the first shaft 29 (FIGS. 3-5) and the second power input component 102 is second shaft 31 (FIGS. 3-5). As such, in certain embodiments, the gear assembly 100 is configured to receive power or torque from a first turbine (e.g., first turbine 30 in FIGS. 3-5) and a second turbine (e.g., second turbine 32 in FIGS. 3-5). In some embodiments, the second turbine 32 is connected to the gear assembly 100 via a ring gear, such as described herein. Still further, in certain embodiments, the first turbine and the second turbine are rotatably independent of another, such that rotation of one turbine does not necessarily induce rotation of the other turbine.

The first power input component 101 and the second power input component 102 may generally include coaxial counter-rotating shafts with respect to one another, such as indicated by "+" and "−" in FIGS. 7-8. The first power input component 101 may generally be coupled to a higher speed spool than the second power input component 102. As such, the first power input component 101 is generally rotatable at a higher speed than the second power input component 102. Furthermore, the gear assembly 100 is configured to receive the first power input component 101 at a higher rotational speed than the second power input component 102.

Referring still to FIGS. 7-8, the gear assembly 100 includes a static component assembly 140 fixed relative to a gear assembly centerline axis 104, such as fixed along a circumferential direction C relative to the gear assembly centerline axis 104. A reference radial direction R is extended from the gear assembly centerline axis 104. In various embodiments, the first power input component 101 is configured to rotate in a first direction relative to the gear assembly centerline axis 104, and the second power input component 102 is configured to rotate in a second direction opposite of the first direction. In still various embodiments, the power output component 103 is configured to rotate co-directional to the first power input component 101.

The static component assembly 140 is operably connected to the first power input component 101 to allow the gear assembly to be statically determinate, such that static component assembly 140 allows loads to transfer from the first power input component 101 to the power output component 103. The static component assembly 140 is further operably connected to the second power input component 102 to allow the gear assembly to be statically determinate, such that static component assembly 140 allows loads to transfer from the second power input component 102 to the power output component 103. In various embodiments such as depicted and described in regard to FIGS. 7-8, the static component assembly 140 includes one or more gears, such as a first gear 141 and a second gear 142 depicted and described herein. The first gear 141 are fixed relative to the gear assembly centerline axis 104.

In still certain embodiments, the power output component 103 includes a first rotatable gear circumferentially rotatable around the gear assembly centerline axis 104. The first rotatable gear 131 includes a component centerline axis with respect to each gear. In certain embodiments, each gear of the power output component 103 is rotatable around its respective component centerline axis while further being rotatable along the circumferential direction C relative to the gear assembly centerline axis 104.

In various embodiments, the static component assembly 140 includes a mount structure 146. In certain embodiments, the mount structure 146 includes frames, casings, mounts, static shafts, or other substantially fixed or grounded structures. Although not depicted in further detail, it should be appreciated that the mount structure 146 may include any one or more fixed structures of the engine 10 or turbomachines generally. In various embodiments, the mount structure 146 is an inlet casing at the fan assembly 14 or forward of the compressor section 21 (FIGS. 3-5), an intermediate case positioned between the low-speed compressor 22 and the high-speed compressor, or other fixed structure at the fan assembly 14, compressor section 21, or heat addition system 26. In still various embodiments, the mount structure 146 is a turbine casing, a turbine center frame, mid-turbine frame, or turbine rear frame positioned at the expansion section 33, or other fixed structure aft or downstream of the expansion section 33, or other appropriate fixed structure at a turbomachine, such as depicted in FIG. 6. In still another embodiment, the mount structure 146 is conical or frusto-conical arm connected to the ring gear 141.

The gear assembly 100 is operably connected to transmit power or torque from the first and second power input components 101, 102 to a power output component 103. In various embodiments, the power output component 103 is connected to a load device. In certain embodiments, the load device is a fan or propeller assembly (e.g., fan assembly 14 in FIGS. 1-5), an electric machine, a rotary wing assembly (e.g., helicopter rotor), or other power output or propulsion device. In still certain embodiments, the power output component 103 includes a shaft driven at least in part by power received through the gear assembly 100 from the first and second turbines 30, 32. In various embodiments, the power output component 103 is configured to rotate co-directionally with either the first power input component 101 or the second power input component 102, such as indicated by "+" or "−" in FIGS. 7-8.

Referring still to FIGS. 7-8, various embodiments of the gear assembly 100 include bearings connected to certain components described herein to allow for rotation about a component centerline axis, a gear assembly centerline axis, or both, such as further described herein. It should be appreciated that certain embodiments depicted and described herein may omit, for clarity, depictions of bearing placement and/or static structures to which the bearings may be fixed. In certain embodiments, bearings are placed between the static component assembly 140 and one or more structures rotatable around the gear assembly centerline axis 104, including, but not limited to, the first power input component 101, the second power input component 102, the power output component 103, or the gears. In still certain embodiments, bearings are placed between the static component assembly 140 and one or more structure rotatable relative to the component centerline axis, including, but not limited to, the gears of the static component 140. The bearing may include any appropriate bearing type, or combinations thereof. It should be appreciated that one skilled in the art would reasonably ascertain without undue experimentation bearing assembly types (e.g., roller bearings, thrust bearings, journal bearings, fluid film bearings, etc.) that may be utilized to receive or transmit power, rotate certain structures relative to a desired axis, fix or mount certain structures relative to a desired axis, or otherwise arrange or operate the embodiments of the gear assembly 100 provided herein.

Referring still to FIGS. 7-8, it should be appreciated that some schematic embodiments provided herein are partially exploded, such that surfaces or interfaces may appear separated from adjacent structures. However, unless otherwise stated, interfaces or meshes depicted or described herein are operably coupled together, such as to desirably transfer power or torque between components or features described herein. Interfaces depicted and described herein between rotary and/or fixed structures may include any appropriate gear type, gear mesh, spline, or other interface. It should be appreciated that one skilled in the art would reasonably ascertain without undue experimentation gear spline types (e.g., helical splines, serrations, crowned splines, parallel key splines, etc.) or gear types (e.g., helical, bi-helical, spur, etc.) that may be utilized to receive or transmit power, limit undesired vibrations or resonances, mitigate undesired wear or deterioration, or other considerations known in the art for gear interfaces.

Referring now to FIG. 7, a schematic embodiment of a gear assembly 500 is provided. Embodiments of the gear assembly 500 provided in regard to FIG. 7 may be configured substantially similarly as described in regard to the gear assembly 100 and the engine 10 in FIGS. 1-5. The gear assembly 500 provided herein includes the first power input component 101 operably coupled to a first rotatable gear 131 at a first interface 111. The gear assembly 500 further includes the first power input component 101 operably coupled to a second rotatable gear 132 at a second interface 121. Each of the first rotatable gear 131 and the second rotatable gear 132 are rotatable along a circumferential direction around the gear assembly centerline axis 104. The second power input component 102 is operably coupled to the second rotatable gear 132.

The power output component 103 is coupled to each of the first and second rotatable gears 131, 132 such as to receive power or torque from the first power input component 101 and the second power input component 102. Particularly, the power output component 103 is operably coupled to receive power or torque from the first power input component 101 via the first rotatable gear 131. Furthermore, the power output component 103 is operably coupled to receive power or torque from the first power input component 101 and the second power input component 102 via the second rotatable gear 132. Various embodiments may include a carrier structure 102A, 103A, coupling each respective gear to an input component or output component. The carrier structure may generally couple to a center portion of the respective gear, such as at, proximate to, or around a component centerline axis 105 (e.g., 105A, 105B, 105C).

The rotatable gears 131, 132 may generally be configured each as a plurality of gears in circumferential arrangement relative to the gear assembly centerline axis 104. The first power input component 101 is coupled to the respective rotatable gears 131, 132 via respective interfaces 111, 121 as described above. In certain embodiments, the first interface 111 defines gear meshes or spline interfaces at which power is transferred from the first power input component 101 to rotate the first rotatable gear 131 around the gear assembly centerline axis 104. The power output component 103 is operably coupled to each of the first rotatable gear 131, such as via a carrier structure 103A.

In still certain embodiments, the power output component 103 is operably coupled to each of the second rotatable gear 132 at an output interface 113. The second power input component 102 is operably coupled to the second rotatable gear 132, such as via a carrier structure 102A. The interfaces may allow for torque transfer between the second power input component 102, the second rotatable gear 132, and the power output component 103. In certain embodiments, the power output component 103 includes a ring gear at the output interface 113 surrounding a plurality of the second rotatable gear 132.

The gear assembly 500 further includes the static component 140 positioned at a static component interface 134 with the first rotatable gear 131. The static component interface 134 may generally define a gear mesh or spline interface such as described herein. In one particular embodiment, the static component includes a ring gear 141 at the static component interface 134 operably meshed or contacted with a plurality of the first rotatable gear 131. The static component 140 may generally allow the gear assembly to be statically determinate, such that the static component assembly 140 allows loads to transfer from the first power input component 101 to the power output component 103. The static component interface 134 may define an interface providing a surface at which the first rotatable gear 131 reacts against the fixed surface to allow for torque transfer and rotation of the power output component 103, such as described herein.

In certain embodiments, the first power input component 101 includes a sun gear at the first interface 111. In still certain embodiments, the first power input component 101 includes a gear mesh interface at the second interface 121. In various embodiments, the first power input component 101 is coupled to the respective first rotatable gear 131 and second rotatable gear 132 at an inner radius relative to the static component interface 134 and output interface 113.

Referring still to FIG. 7, and further in conjunction with FIGS. 3-4, in various embodiments, the gear assembly 500 is operably coupled to an intermediate-speed or high-speed turbine assembly via the first power input component 101. In certain embodiments, the first power input component 101 is furthermore coupled to an intermediate-speed or high-speed compressor assembly. Referring to FIG. 7 and FIG. 4, in another embodiment, one or more of the compressor or turbine may include interdigitated rotors with one or more other respective compressors or turbines.

Referring now to FIG. 8, a schematic embodiment of a gear assembly 600 is provided. Embodiments of the gear assembly 600 provided in regard to FIG. 8 may be configured substantially similarly as described in regard to the gear assembly 100 and engine 10 in FIGS. 1-6. In certain embodiments the gear assembly 600 is configured particularly in regard to the schematic engine of FIG. 5. The gear assembly 600 provided herein includes the first power input component 101 operably coupled to a second gear 142 at the second interface 121. The gear assembly 600 further includes the first power input component 101 operably coupled to the first rotatable gear 131 at the first interface 111. The first rotatable gear 131 is rotatable along a circumferential direction around the gear assembly centerline axis 104. The second gear 142 is stationary relative to the gear assembly centerline axis 104. However, the second gear 142 may generally be rotatable relative to its respective component centerline axis 105B. In certain embodiments, the second gear 142 is a planet gear configured to rotate relative to the component centerline axis 105B and remain stationary relative to the gear assembly centerline axis 104.

The second power input component 102 is operably coupled to the second gear 142 at a second power input component interface 122. In certain embodiments, the second power input component 102 includes a ring gear at the second power input component interface 122 coupled with a plurality of the second gear 142. The second gear 142 is connected to the static component 140, such as to fix the second gear 142 relative to the gear assembly centerline axis 104. The second gear 142 provides a surface at which forces from the second power input component 102 may react to transfer energy to the first power input component 101. In various embodiments, the static component 140 is connected to the second gear 142 and the first rotatable gear 131, such as via a carrier or connecting structure 140A extended axially between the second gear 142 and the first rotatable gear 131.

The power output component 103 is coupled to each of the second gear 142 such as to receive power or torque from the first power input component 101 via the second interface 121. Power received by the power output component 103 from the first power input component 101 also includes power transmitted from the second power input component 102 via the second gear 142 and second interface 121. Particularly, the power output component 103 is operably coupled to receive power or torque from a plurality of the first rotatable gear 131 via the first interface 111.

Various embodiments may include a carrier structure 103A coupling each respective first rotatable gear 131 to the power output component 103. The carrier structure may generally couple to a center portion of the respective plurality of the first rotatable gear 131, such as at, proximate to, or around a respective component centerline axis 105A of the first rotatable gear 131. In one embodiment, such as depicted in FIG. 7, the carrier structure 103A further connects the power output component 103 to the first rotatable gear 131 and the second rotatable gear 132 across an axial span relative to the gear assembly centerline axis 104.

The first rotatable gears 131 may generally be configured each as a plurality of gears in circumferential arrangement relative to the gear assembly centerline axis 104. The first power input component 101 is coupled to the respective first rotatable gears 131 via respective first interfaces 111 as described above. In certain embodiments, the first interface 111 defines gear meshes or spline interfaces at which power is transferred from the first power input component 101 to rotate the first rotatable gear 131, and the power output component 103 attached thereto, around the gear assembly centerline axis 104. The power output component 103 is operably coupled to each of the first rotatable gear 131, such as via a carrier structure 103A.

The gear assembly 600 further includes the static component 140 positioned at a static component interface 134 with the first rotatable gear 131. The static component interface 134 may generally define a gear mesh or spline interface such as described herein. In one particular embodiment, the static component includes a ring gear 141 at the static component interface 134 operably meshed or contacted with a plurality of the first rotatable gear 131. The static component 140 may generally allow for power or torque transfer from the first power input component 101 through the first rotatable gear 131 to the power output component 103. The static component interface 134 may define an interface providing a surface at which the first rotatable gear 131 reacts against the fixed surface to allow for torque transfer and rotation of the power output component 103, such as described herein.

In certain embodiments, the first power input component 101 includes a first sun gear at the first interface 111. In still certain embodiments, the first power input component 101 includes a second sun gear at the second interface 121. In various embodiments, the first power input component 101 is coupled to the respective first rotatable gear 131 and second gear 142 at an inner radius relative to the static component interface 134 and output interface 113.

Referring still to FIG. 8, and further in conjunction with FIGS. 5-6, in various embodiments, the gear assembly 600 is operably coupled to an intermediate-speed or high-speed turbine assembly via the first power input component 101. In either embodiment, one or more of the turbines may include interdigitated rotors with one or more other respective turbines. In still certain embodiments, the second power input component 102 includes a low-speed turbine assembly. As such, in various embodiments, the first power input component 101 generally defines a greater rotational speed during operation than the second power input component 102. In certain embodiments, the rotational speed of the second power input component 102 is approximately equal to the rotational speed of the power output component 103.

Referring to FIGS. 7-8, embodiments of the gear assembly 500, 600 generally include the first interface 111 separated from the second interface 121 along an axial direction (i.e., along a direction of extension of the engine centerline axis 12 or the gear assembly centerline axis 104).

Embodiments of the gear assembly 500, 600 depicted and described in regard to FIGS. 7-8 may provide for gear ratios and arrangements that fit within the $L/D_{max}$ constraints of the engine 10 such as depicted and described in regard to FIGS. 1-5. It should be appreciated that the gear assembly 100 generally provided in FIGS. 1-5 may include one or more embodiments of the gear assembly 500, 600 depicted and described in regard to FIGS. 7-8. In certain embodiments, the gear assembly 500, 600 depicted and described in regard to FIGS. 7-8 allow for gear ratios and arrangements providing for rotational speed of the fan assembly 14 (FIG. 2, FIGS. 3-5) corresponding to one or more ranges of cruise altitude and/or cruise speed provided above. It should be appreciated that embodiments of the gear assembly 500, 600 provided herein may allow for large gear ratios (e.g., up to approximately 12:1 or greater) such as provided herein. Embodiments of the gear assembly 500, 600 may provide desired gear ratios within constraints such as, but not limited to, length (L) of the engine 10 (FIG. 2), maximum diameter ($D_{max}$) of the engine 10, $L/D_{max}$ of the engine 10 (FIG. 2), cruise altitude of up to 65,000 ft, and/or operating cruise speed of up to Mach 0.85, or combinations thereof.

Embodiments of the gear assembly provided herein may allow for decoupling the second power input component 102 from the power output component 103. Embodiments depicted and described herein may improve gear assembly maintenance over known configurations, such as e.g., allowing for gear assembly removal without removing one or more shafts. The decoupled second power input component 102, such as a low-pressure turbine, from the power output component 103, such as a fan shaft or low-pressure turbine shaft. Furthermore, arrangements provided herein may improve dynamic closures between rotatable components, such as to improve specific fuel consumption of the engine. Additionally, or alternatively, embodiments of the gear assembly 100, 500, 600 provided herein may provide improvements over epicyclic gear assemblies, such as to simply or otherwise improve lubricant supply and/or reduce weight. For instance, axial separation of the structures and gears coupled to the first interface 111 and the second interface 121 may reduce part count, improve gear assembly strength and allow for greater loads therethrough, improve lubrication, and allow the fan assembly 14 to operate at a lower rotational speed in contrast to known gear assemblies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A turbomachine engine wherein an engine centerline axis is defined therethrough, the engine includes a first power input component rotatable along a first direction relative to the engine centerline axis; a second power input component rotatable along a second direction relative to the engine centerline axis; a power output component rotatable relative to the engine centerline axis; a static component fixed relative to a circumferential direction relative to a gear assembly centerline axis; and a gear assembly. The gear assembly includes a first rotatable gear operably coupled to the first power input component at a first interface, wherein the first rotatable gear is operably coupled to the static component at a static component interface, wherein the static component interface is configured to react against the first rotatable gear to rotate the first rotatable gear relative to the gear assembly centerline axis, and wherein the power output component is operably coupled to the first rotatable gear; wherein the first power input component and the second power input component are together configured to transmit through a second interface at the first power input component to the power output component; and wherein the first interface and the second interface are separated along an axial direction relative to the gear assembly centerline axis.

2. The engine of any one or more clauses herein, wherein the static component at the static component interface is a ring gear.

3. The engine of one or more clauses herein, wherein the first interface is a first sun gear at the first power input component.

4. The engine of one or more clauses herein, wherein the second interface is a second sun gear at the first power input component.

5. The engine of one or more clauses herein, wherein the second interface is a gear mesh interface at the first power input component.

6. The engine of one or more clauses herein, wherein the static component comprises a second gear operably coupled to the second power input component and the first power input component.

7. The engine of one or more clauses herein, wherein the second power input component comprises a ring gear at a second power input component interface at which the second power input component is operably coupled to the second gear.

8. The engine of one or more clauses herein, wherein the static component is operably coupled to the second gear and the first rotatable gear.

9. The engine of one or more clauses herein, wherein the power output component comprises a carrier structure coupled to each of a plurality of the first rotatable gear.

10. The engine of one or more clauses herein, wherein the second power input component comprises a second rotatable gear operably coupled to the power output component and the first power input component.

11. The engine of one or more clauses herein, wherein the power output component comprises a ring gear at an output interface at which the second power input component is operably coupled to the power output component.

12. The engine of one or more clauses herein, wherein the power output component is coupled to the first rotatable gear and the second rotatable gear.

13. The engine of one or more clauses herein, wherein the second power input component comprises a carrier structure coupled to each of a plurality of the second rotatable gear.

14. The engine of one or more clauses herein, wherein the first direction is opposite of the second direction, and wherein the power output component rotates co-directional to the first direction.

15. The engine of one or more clauses herein, wherein the first interface and the second interface are each positioned inward of the first rotatable gear along a radial direction relative to the gear assembly centerline axis.

16. The engine of one or more clauses herein, wherein the first power input component comprises a first shaft defining a higher-speed rotor relative to the second power input component comprising a second shaft defining a lower-speed rotor relative to the first power input component.

17. The engine of one or more clauses herein, wherein the first power input component comprises a first turbine, and wherein the second power input component comprises a second turbine, and wherein the first turbine and the second turbine are in interdigitated arrangement.

18. The engine of one or more clauses herein, wherein the first power input component comprises a first compressor, and wherein the second power input component comprises a second compressor, and wherein the first compressor and the second compressor are in interdigitated arrangement.

19. The engine of one or more clauses herein, the engine comprising a fan assembly operably coupled to the power output component.

20. The engine of one or more clauses herein, wherein the fan assembly is configured as an unshrouded open rotor.

21. The engine of one or more clauses herein, wherein the fan assembly is configured as a shrouded turbofan engine.

22. The engine of one or more clauses herein, wherein the engine is configured with a ratio of length to maximum diameter between 2 and 10.

23. The engine of one or more clauses herein, wherein the engine is configured with a ratio of length to maximum diameter between 2.5 and 9.

24. The engine of one or more clauses herein, wherein the engine is configured with a ratio of length to maximum diameter of at least 2.

25. The engine of one or more clauses herein, wherein the engine is configured as an open rotor engine comprising an equal or fewer quantity of vanes to fan blades.

What is claimed is:

1. A turbomachine engine, wherein an engine centerline axis is defined therethrough, the engine comprising:
   a first power input component rotatable along a first direction relative to the engine centerline axis;
   a second power input component rotatable along a second direction relative to the engine centerline axis;
   a power output component rotatable relative to the engine centerline axis;
   a static component fixed relative to a circumferential direction relative to a gear assembly centerline axis; and
   a gear assembly comprising;
   a first rotatable gear operably coupled to the first power input component at a first interface, wherein the first rotatable gear is operably coupled to the static component at a static component interface, wherein the static component interface is configured to react against the first rotatable gear to rotate the first rotatable gear relative to the gear assembly centerline axis, and wherein the power output component is operably coupled to the first rotatable gear;
   wherein the first power input component and the second power input component are together configured to transmit through a second interface at the first power input component to the power output component; and
   wherein the first interface and the second interface are separated along an axial direction relative to the gear assembly centerline axis, and wherein the first power input component is in direct driving contact with both the first interface and the second interface.

2. The engine of claim 1, wherein the static component at the static component interface is a ring gear.

3. The engine of claim 2, wherein the first interface is a first sun gear at the first power input component.

4. The engine of claim 3, wherein the second interface is a second sun gear at the first power input component.

5. The engine of claim 3, wherein the second interface is a gear mesh interface at the first power input component.

6. The engine of claim 1, wherein the static component comprises a second gear operably coupled to the second power input component and the first power input component.

7. The engine of claim 6, wherein the second power input component comprises a ring gear at a second power input component interface at which the second power input component is operably coupled to the second gear.

8. The engine of claim 7, wherein the static component is operably coupled to the second gear and the first rotatable gear.

9. The engine of claim 6, wherein the power output component comprises a carrier structure coupled to each of a plurality of the first rotatable gear.

10. The engine of claim 1, wherein the second power input component comprises a second rotatable gear operably coupled to the power output component and the first power input component.

11. The engine of claim 10, wherein the power output component comprises a ring gear at an output interface at which the second power input component is operably coupled to the power output component.

12. The engine of claim 11, wherein the power output component is coupled to the first rotatable gear and the second rotatable gear.

13. The engine of claim 10, wherein the second power input component comprises a carrier structure coupled to each of a plurality of the second rotatable gear.

14. The engine of claim 1, wherein the first direction is opposite of the second direction, and wherein the power output component rotates co-directional to the first direction.

15. The engine of claim 1, wherein the first interface and the second interface are each positioned inward of the first rotatable gear along a radial direction relative to the gear assembly centerline axis.

16. The engine of claim 1, wherein the first power input component comprises a first shaft defining a higher-speed rotor relative to the second power input component comprising a second shaft defining a lower-speed rotor relative to the first power input component.

17. The engine of claim 16, wherein the first power input component comprises a first turbine, and wherein the second power input component comprises a second turbine, and wherein the first turbine and the second turbine are in interdigitated arrangement.

18. The engine of claim 16, wherein the first power input component comprises a first compressor, and wherein the second power input component comprises a second compressor, and wherein the first compressor and the second compressor are in interdigitated arrangement.

19. The engine of claim 1, the engine comprising: a fan assembly operably coupled to the power output component.

20. The engine of claim 19, wherein the fan assembly is configured as an unshrouded open rotor.

* * * * *